United States Patent
Kirby et al.

(10) Patent No.: US 12,421,175 B2
(45) Date of Patent: Sep. 23, 2025

(54) ENVIRONMENTAL BARRIER COATINGS

(71) Applicant: General Electric Company, Schenectady, NY (US)

(72) Inventors: Glen Harold Kirby, Liberty Township, OH (US); Nathaniel Patrick Brown, Cincinnati, OH (US); Guruvenket Srinivasan, Loveland, OH (US); Reza Sarrafi-Nour, Clifton Park, NY (US); Nicholas Edward Antolino, Schenectady, NY (US); Julin Wan, Rexford, NY (US); Anant Achyut Setlur, Niskayuna, NY (US); Taryn Elizabeth Hewitt, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 673 days.

(21) Appl. No.: 17/584,496

(22) Filed: Jan. 26, 2022

(65) Prior Publication Data

US 2023/0234895 A1     Jul. 27, 2023

(51) Int. Cl.
| | |
|---|---|
| C04B 41/52 | (2006.01) |
| C04B 41/00 | (2006.01) |
| C04B 41/45 | (2006.01) |
| C04B 41/50 | (2006.01) |

(52) U.S. Cl.
CPC ........ *C04B 41/522* (2013.01); *C04B 41/0072* (2013.01); *C04B 41/009* (2013.01); *C04B 41/4529* (2013.01); *C04B 41/5024* (2013.01); *C04B 41/5096* (2013.01)

(58) Field of Classification Search
None
See application file for complete search history.

(56) References Cited

U.S. PATENT DOCUMENTS

| | | |
|---|---|---|
| 7,306,860 B2 | 12/2007 | Strangman et al. |
| 8,999,457 B2 | 4/2015 | Kirby et al. |
| 9,212,100 B2 | 12/2015 | Kirby et al. |
| 9,890,089 B2 | 2/2018 | Kirby et al. |
| 10,125,618 B2 | 11/2018 | Lee |
| 2014/0255680 A1 | 9/2014 | Lee et al. |
| 2016/0108510 A1* | 4/2016 | Kirby ............... C23C 4/02 501/133 |
| 2017/0044930 A1 | 2/2017 | Luthra et al. |
| 2017/0191152 A1 | 7/2017 | Grossman et al. |
| 2019/0226346 A1* | 7/2019 | Kirby ............... C04B 41/009 |
| 2020/0056489 A1 | 2/2020 | Zaleski et al. |

FOREIGN PATENT DOCUMENTS

EP     1996341 B1 *   9/2018     ......... C04B 41/009

\* cited by examiner

*Primary Examiner* — Jeffrey D Washville
(74) *Attorney, Agent, or Firm* — Dority & Manning, P.A.

(57) ABSTRACT

Environmental barrier coatings including a bondcoat layer including silicon and a rare earth silicate-based hermetic layer and rare earth silicate-based non-hermetic layer are provided. The rare earth silicate-based hermetic layer is deposited on the bondcoat via a thermal spray process and has an elastic modulus ranging from 100 GPa to 180 GPa. The at least one rare earth silicate-based non-hermetic layer is deposited on the rare earth silicate-based hermetic layer and has an elastic modulus ranging from 50 GPa to 100 GPa. Coated gas turbine engine components and methods for coating gas turbine engine components are also provided.

20 Claims, 6 Drawing Sheets

ENVIRONMENTAL BARRIER COATINGS

FIELD OF TECHNOLOGY

The present disclosure relates generally to environmental barrier coatings (EBCs) and components coated with the same.

BACKGROUND

The operating environment within a gas turbine engine can be both thermally and chemically hostile. Although high temperature iron, nickel and cobalt-based superalloys have been developed for engine components, components formed from such alloys may require long service exposures if located in certain sections of a gas turbine engine, such as the turbine and/or combustor sections. EBCs can be applied to components to protect them from the harsh environment in high temperature engine sections. Application methods and parameters of such EBCs may affect, for example, microstructures and porosity of the coating, which may in turn affect the underlying substrate materials. Therefore, alternative EBCs and methods for their formation would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present disclosure.

DETAILED DESCRIPTION OF PARTICULAR EMBODIMENTS

Reference now will be made in detail to embodiments of the present disclosure, one or more examples of which are illustrated in the drawings. Each example is provided by way of explanation of the present disclosure, not limitation thereof. In fact, it will be apparent to those skilled in the art that various modifications and variations can be made in the present disclosure without departing from its scope. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first", "second", and "third" may be used interchangeably to distinguish one component from another and are not intended to signify location or importance of the individual components.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the terms "substantially free" are understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight component materials, such as ceramic matrix composites (CMCs) have been proposed.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

An air plasma spray (APS) microstructure for a rare earth disilicate can be porous in the deposited state and not hermetic toward the gaseous species that could cause volatilization of the ceramic matrix composite. Deposition of a glassy layer, such as barium strontium alumino-silicate (BSAS), may be sprayed in the coating system to provide a hermetic layer toward these gaseous species. However, additional layers of rare earth silicate may also be needed and sprayed to separate the glassy layer from the silica source.

The present disclosure provides an EBC applied via a plasma spray process that includes a rare earth silicate-based hermetic layer. The rare earth silicate-based hermetic layer is formed adjacent to the silicon bondcoat, thus eliminating the need for the glassy layers (e.g., BSAS) and the additional silicate-based layers that separate the glassy layer. Also, this disclosure broadly relates to a gas turbine engine component coated with the EBC including a rare earth silicate-based hermetic layer. A method for coating the component with the EBC is also provided.

In general, the silicon bondcoat includes a sintering aid that diffuses, during subsequent sintering, into an overlying silicate-based layer to form a rare earth silicate-based hermetic portion adjacent to the silicon bondcoat and a rare earth silicate-based non-hermetic portion thereon. Thus, the resulting coating includes a silicon bondcoat having a rare earth silicate-based hermetic layer formed thereon and a rare earth silicate-based non-hermetic layer formed thereon. These layers are discussed in greater detail below with respect to exemplary embodiments.

Figure 1:
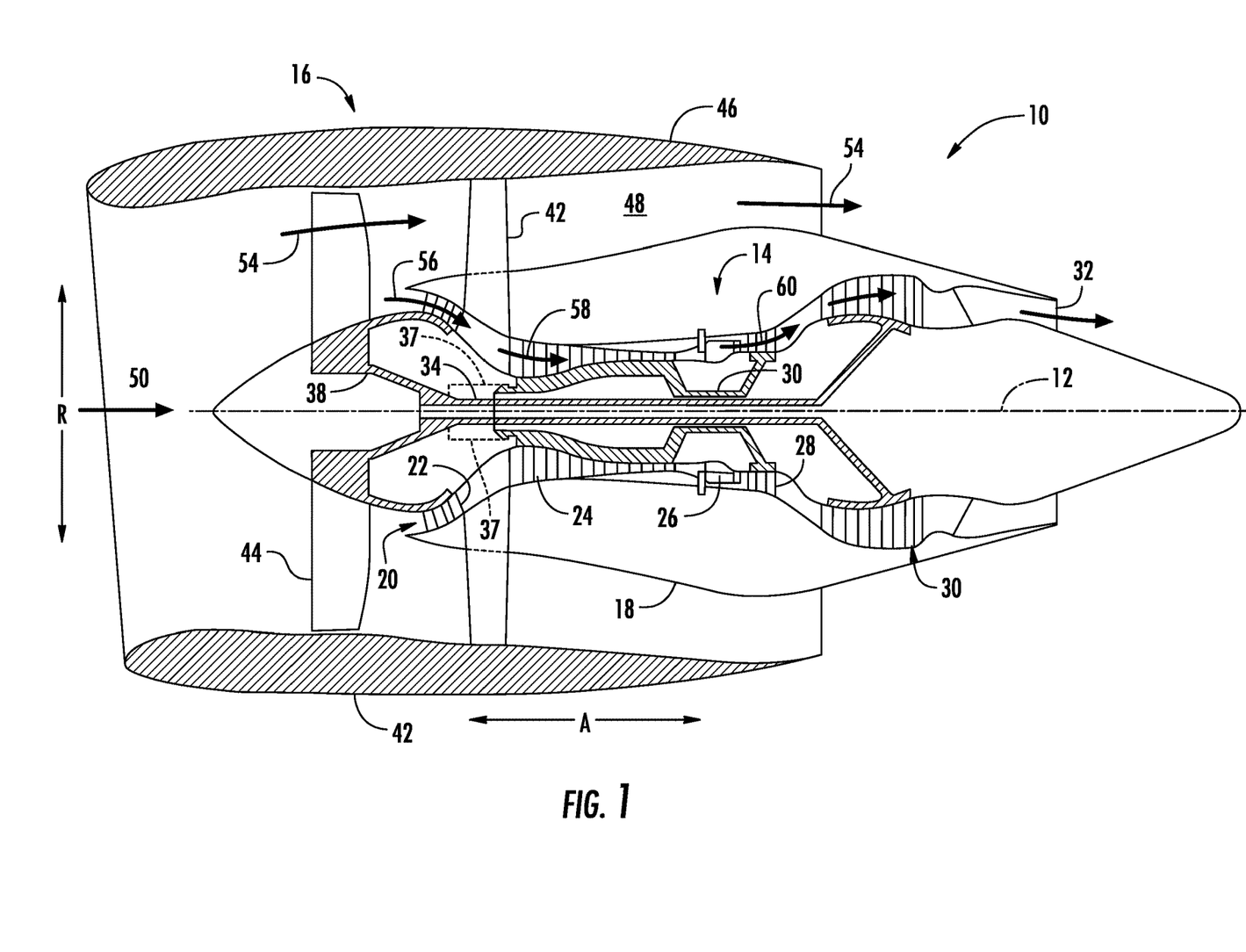
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor turbofan engine (e.g., a turbofan without an outer nacelle), a turboshaft, turbojet, or a turboprop configuration, including marine and industrial turbine engines and auxiliary power units.

In general, the gas turbine engine 10 includes a turbomachine 14 and a fan section 16 positioned upstream thereof. The turbomachine 14 generally includes a substantially tubular outer casing 18 that defines an annular inlet 20. In addition, the outer casing 18 may further enclose and support a low pressure (LP) compressor 22 for increasing the pressure of the air that enters the turbomachine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products are directed from the combustor 26 along the hot gas path of the gas turbine engine 10 to a high pressure (HP) turbine 28 for driving the HP compressor 24 via a high pressure (HP) shaft 30 or spool, and then to a low pressure (LP) turbine 32 for driving the LP compressor 22 and fan section 16 via a low pressure (LP) shaft 34 or spool that is generally coaxial with HP shaft 30. After driving each of turbines 28 and 32, the combustion products may be expelled from the turbomachine 14 via an exhaust nozzle 36 to provide propulsive jet thrust.

Additionally, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38, such as in a direct-drive configuration. In alternative configurations, the LP shaft 34 may be connected to the fan rotor 38 via a speed reduction device 37 such as a reduction gear gearbox in an indirectdrive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the turbomachine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the turbomachine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass airflow conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Various components of the gas turbine engine 10 can include the EBC of the present disclosure. For example, in various embodiments, the articles of the present disclosure can include, without limitation, a turbine engine component selected from the group consisting of combustor components, turbine blades, shrouds, nozzles, heat shields, and vanes.

Figure 2:
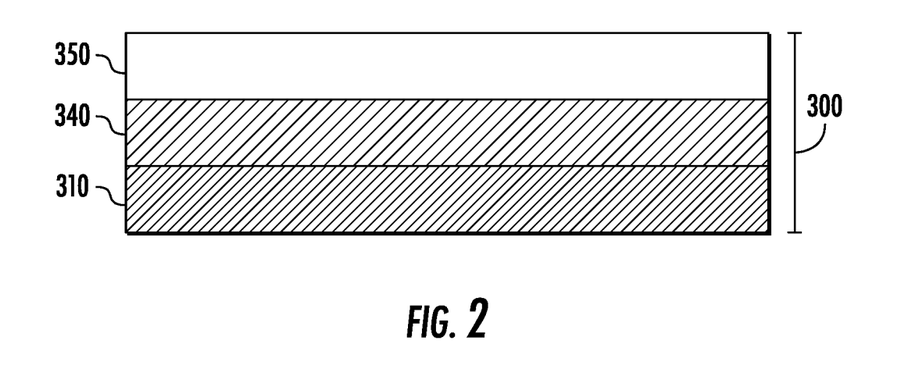
FIG. 2 is a cross-sectional representation of an EBC according to example embodiments of the present disclosure.
Figure 3:
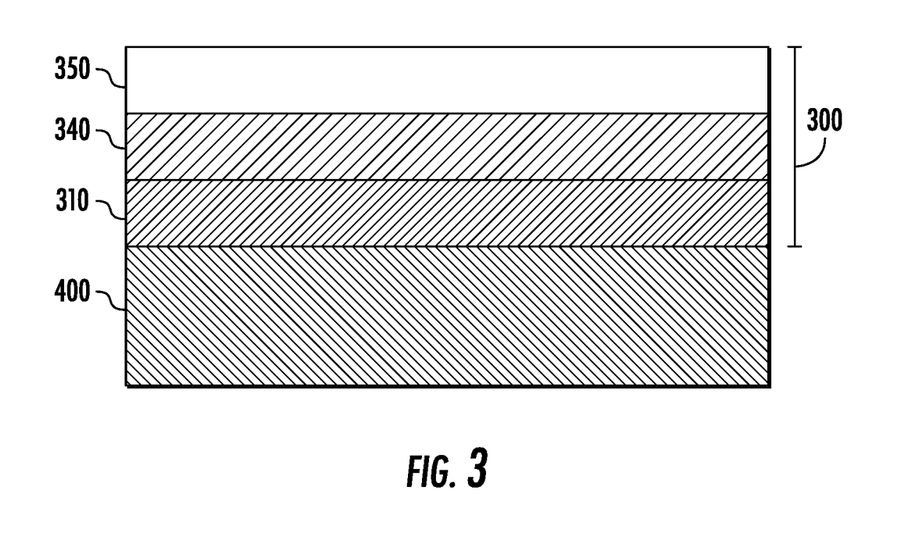
FIG. 3 is a cross-sectional representation of an EBC applied to a component according to example embodiments of the present disclosure.

FIG. 2 depicts, in cross-section, the coating of the present disclosure. EBC 300 includes a bondcoat 310 layer, a rare earth silicate-based hermetic layer 340 deposited on the bondcoat layer 310, and a rare earth silicate-based non-hermetic layer 350 deposited on the rare earth silicate-based hermetic layer 340. FIG. 3 depicts, in cross-section, the EBC 300 of FIG. 2 disposed on a component 400, such as a gas turbine engine component.

The component 400 may be any material comprising silicon, such as a ceramic or metal alloy, for example. The component 400 may include a ceramic material, such as silicon carbide, silicon nitride, silicon carbon nitride, silicon oxynitride, and silicon aluminum oxynitride for example. In certain embodiments, the component 400 can include composite materials such as metal matrix composites (MMCs) or ceramic matrix composites (CMCs), as described above. Composite materials, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

The component 400 may be coated with a bondcoat 310 comprising silicon. In some embodiments, the bondcoat 310 comprises silicon metal applied to the component 400. The bondcoat 310 can have a thickness ranging from 50 micrometers to 150 micrometers, such as 70 micrometers to 120 micrometers, such as 100 micrometers. In other embodiments, however, the bondcoat 310 can have a thickness of 0.0253 to 0.506 mm (1 to 20 mils), and more typically from 0.051 to 0.152 mm (2 to 6 mils). Alternatively or additionally, the component 400 may be pre-oxidized to provide a silica ($SiO_2$) bondcoat. The bondcoat 310 can prevent oxidation of the underlying component and a corresponding release of gases, formation of gas bubbles, and spallation of the EBC. The bondcoat 310 can also provide improved adhesion of subsequently applied coats, such as the rare earth silicate-based hermetic layer 340 and/or the rare earth silicate-based non-hermetic layer 350. The bondcoat 310 can also decrease the risk that application of the rare earth silicate-based hermetic layer 340 and/or rare earth silicate-based non-hermetic layer 350 will damage the underlying component 400. The bondcoat 310 can be applied to the component 400 by any known method of depositing a solid coating, such as by thermal spraying, plasma spraying, and any other known application techniques.

As stated above, the bondcoat 310 includes silicon and a sintering aid at deposition. The sintering aid may include an iron-containing species, an aluminum-containing species, a boron-containing species, or a combination thereof. The sintering aid may be included, at deposition prior to sintering, in the bondcoat in an amount of 0.001 wt. % to 10 wt. %, such as 0.01 wt. % to 5 wt. %.

During sintering of the bondcoat 310 and subsequently deposited layers (e.g., silicate-based layers), the sintering aid diffuses into the overlying, subsequently applied silicate-based layers to convert rare earth monosilicate to rare earth disilicate. The rare earth disilicate is not inhibited from sintering at the sintering temperatures below the silicon melting point of 1414° C. and thus allows the rare earth disilicate to densify and form a high-density portion that is adjacent to the underlying bondcoat. In one embodiment, this diffusion of the sintering aid allows substantially all of the rare earth monosilicate present to be locally consumed in the portion closest to the bondcoat 310. The resulting high-density portion forms a hermetic layer at temperatures within an allowable range (e.g., 1260° C. to 1344° C.) that does not degrade the CMC substrate. Thus, sintering transforms the as-deposited silicate-based layer(s) to a rare earth silicate-based hermetic layer 340 (closest to the bondcoat) and a rare earth silicate-based non-hermetic layer 350 on the rare earth silicate-based hermetic layer 340. In one embodiment, the sintering aid is selected to be compatible with the resulting layers. For example, the iron-containing species, the aluminum-containing species, the boron-containing species, or the combination thereof do not form any unique compounds within the layer but rather dissolve into a rare earth disilicate phase of the rare earth silicate-based hermetic layer 340.

In addition to the increased density of the rare earth silicate-based hermetic layer 340, the rare earth silicate-based hermetic layer 340 may have a different elastic modulus than the overlying rare earth silicate-based non-hermetic layer 350. Additionally, the rare earth silicate-based non-hermetic layer 350 generally retains its microstructural features from its method of deposition.

After sintering, the rare earth silicate-based hermetic layer 340 is thinner than the rare earth silicate-based non-hermetic layer 350. For example, the rare earth silicate-based hermetic layer 340 can have a thickness ranging from 6 micrometers to 25 micrometers, such as from 6 micrometers to 15 micrometers. The rare earth silicate-based hermetic layer 340 can form a thin, hermetic layer capable of protecting the underlying bondcoat 310 and component 400 from water and/or water vapor. The rare earth silicate-based hermetic layer 340 can include a hermetic microstructure having a density of 85% or more of its theoretical density. In certain embodiments, the rare earth silicate-based hermetic layer 340 can include a hermetic microstructure having a density of 90% or more of its theoretical density, such as 95% of more of its theoretical density, such as 97% or more of its theoretical density.

In certain embodiments, the hermetic microstructure of the rare earth silicate-based hermetic layer 340 has closed porosity. For example, the closed porosity can include a porosity by volume % of less than 15 percent. In various other embodiments, the closed porosity includes a porosity by volume % of less than 10 percent, such as less than 5 percent, such as less than 3 percent. In certain embodiments, the hermetic microstructure includes a rare earth disilicate phase.

The rare earth silicate-based hermetic layer 340 can include any rare earth silicate including a silicate having a rare earth element selected from the group consisting of ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a mixture thereof. In various embodiments, the rare earth silicate is $(Yb_x, Y_{1-x})_2Si_2O_7$ where $0 \leq x \leq 1$. For example, the rare earth disilicate can include $Yb_2Si_2O_7$, $Y_2Si_2O_7$, or a mixture thereof. In particular embodiments, x may be 0.4 to 0.6 (i.e., $0.4 \leq x \leq 0.6$). For example, the rare earth silicate may include $(Yb_{0.6}Y_{0.4})_2Si_2O_7$, $(Yb_{0.4}Y_{0.6})_2Si_2O_7$, or a mixture thereof. In one particular embodiment, the rare earth silicate-based hermetic layer 340 includes a rare earth disilicate as a primary component (e.g., 95 wt % or more of the rare earth silicate-based hermetic layer 340 is a rare earth disilicate). In certain embodiments, the rare earth silicate-based hermetic layer 340 is substantially free from rare earth monosilicates.

The rare earth silicate-based hermetic layer 340 can have an elastic modulus ranging from 100 GPa to 180 GPa, such as from 120 GPa to 180 GPa, such as 140 GPa to 160 GPa. As used herein "elastic modulus" refers to the Young's modulus, also referred to as the modulus of elasticity in tension. In certain embodiments, the rare earth silicate-based hermetic layer 340 has a higher elastic modulus as compared to the remaining layers or portions of the EBC coating (e.g., the rare earth silicate-based non-hermetic layer(s) 350). For example, as will be discussed hereinbelow, additional layers, such as the rare earth silicate-based non-hermetic layers 350 of the EBC coating have a lower elastic modulus as compared to the rare earth silicate-based hermetic layer 340. The rare earth silicate-based hermetic layer 340 can be formed by sintering a rare earth silicate in-situ or ex-situ with a sintering aid. Formation of the rare-earth silicate-based hermetic layer 340 with respect to the rare earth silicate-based non-hermetic layer 350 will be further discussed herein.

The rare earth silicate-based non-hermetic layer 350 can be disposed on the rare earth silicate-based hermetic layer 340. The rare earth silicate-based non-hermetic layer 350 can include one or more non-hermetic layers having a thickness ranging from 10 micrometers to 1250 micrometers, such as from 50 micrometers to 1000 micrometers, such as from 100 micrometers to 800 micrometers, such as from 300 micrometers to 600 micrometers. In certain embodiments, the rare earth silicate-based non-hermetic layer 350 has a thickness of from 100 micrometers to 450 micrometers. The rare earth silicate-based non-hermetic layer 350 can include a microstructure that is not hermetic and further includes a microstructure that is more typical of sprayed coatings (e.g., plasma-sprayed coatings). For example, the rare earth silicate-based non-hermetic layer 350 can include splats, splat boundaries, as well as some cracking and porosity. As previously disclosed, the rare earth silicate-based non-hermetic layer 350 can have a lower elastic modulus as compared to the rare earth silicate-based hermetic layer 340. For example, the rare earth silicate-based non-hermetic layer 350 can have an elastic modulus ranging from 50 GPa to 100 GPa. The rare earth silicate-based non-hermetic layer 350 can provide a thick, compliant portion for the EBC 300 enabling the EBC 300 to absorb and preventing spallation of the EBC 300 during thermal and/or mechanical shock, which enables less stress being transferred into component 400.

The rare earth silicate-based non-hermetic layer 350 can include any rare earth silicate including a silicate having a rare earth element selected from the group consisting of ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a mixture thereof. In various embodiments, the rare earth silicate is $(Yb_x, Y_{1-x})_2Si_2O_7$ where $0 \leq x \leq 1$. For example, the rare earth disilicate can include $Yb_2Si_2O_7$, $Y_2Si_2O_7$, or a mixture thereof. In particular embodiments, x may be 0.4 to 0.6 (i.e., $0.4 \leq x \leq 0.6$). For example, the rare earth silicate may include $(Yb_{0.6}Y_{0.4})_2Si_2O_7$, $(Yb_{0.4}Y_{0.6})_2Si_2O_7$, or a mixture thereof.

In certain embodiments, the rare earth silicate-based non-hermetic layer 350 can include a monosilicate. For example, in certain embodiments, the rare earth silicate-based non-hermetic layer 350 includes from 5 volume % to 25 volume % of monosilicate. Suitable monosilicate can include rare earth monosilicate. For example, the rare earth monosilicate can include $(Yb_y, Y_{1-y})_2SiO_5$ where $0 \leq y \leq 1$ or mixtures thereof. In some embodiments, the rare earth silicate-based hermetic layer comprises a rare earth silicate composition that is different from the at least one rare earth silicate-based non-hermetic layer.

Figure 4:
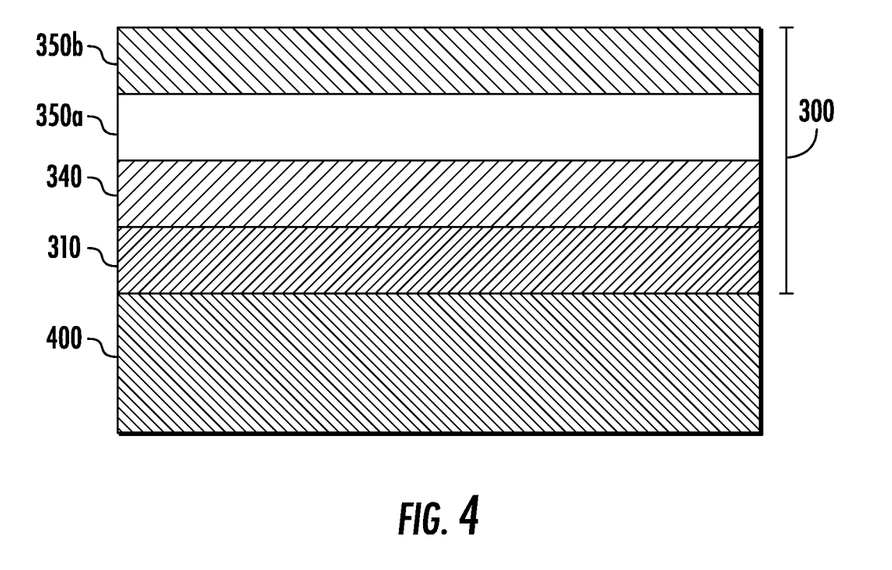
FIG. 4 is a cross-sectional representation of an EBC applied to a component according to example embodiments of the present disclosure.

In some embodiments, such as that shown in FIG. 4, the EBC 300 can include a bondcoat 310, a rare earth silicate-based hermetic layer 340, a first rare earth silicate-based non-hermetic layer 350a, and a second rare earth silicate-based non-hermetic layer 350b. In such embodiments, the first rare earth silicate-based non-hermetic layer 350a can have a thickness ranging from 10 micrometers to 200 micrometers, such as 80 micrometers to 120 micrometers, such as 100 micrometers, and an elastic modulus in the range of 80 GPa to 110 GPa. The second rare earth silicate-based non-hermetic layer 350b can have a thickness ranging from 10 micrometers to 1250 micrometers, such as 310 micrometers to 370 micrometers, such as 350 micrometers, and an elastic modulus in the range of 70 GPa to 80 GPa.

While different layers are illustrated, it is to be understood that each of the rare earth silicate-based hermetic layer 340 and rare earth silicate-based non-hermetic layers 350 may be formed from a simultaneously applied precursor silicate-based layer (e.g., utilizing a thermal spray feedstock, such as an APS feedstock) prior to sintering. Then, as discussed above, sintering may form the rare earth silicate-based hermetic layer 340 and rare earth silicate-based non-hermetic layers 350 through the diffusion of the sintering aid of the underlying bondcoat.

Figure 5:
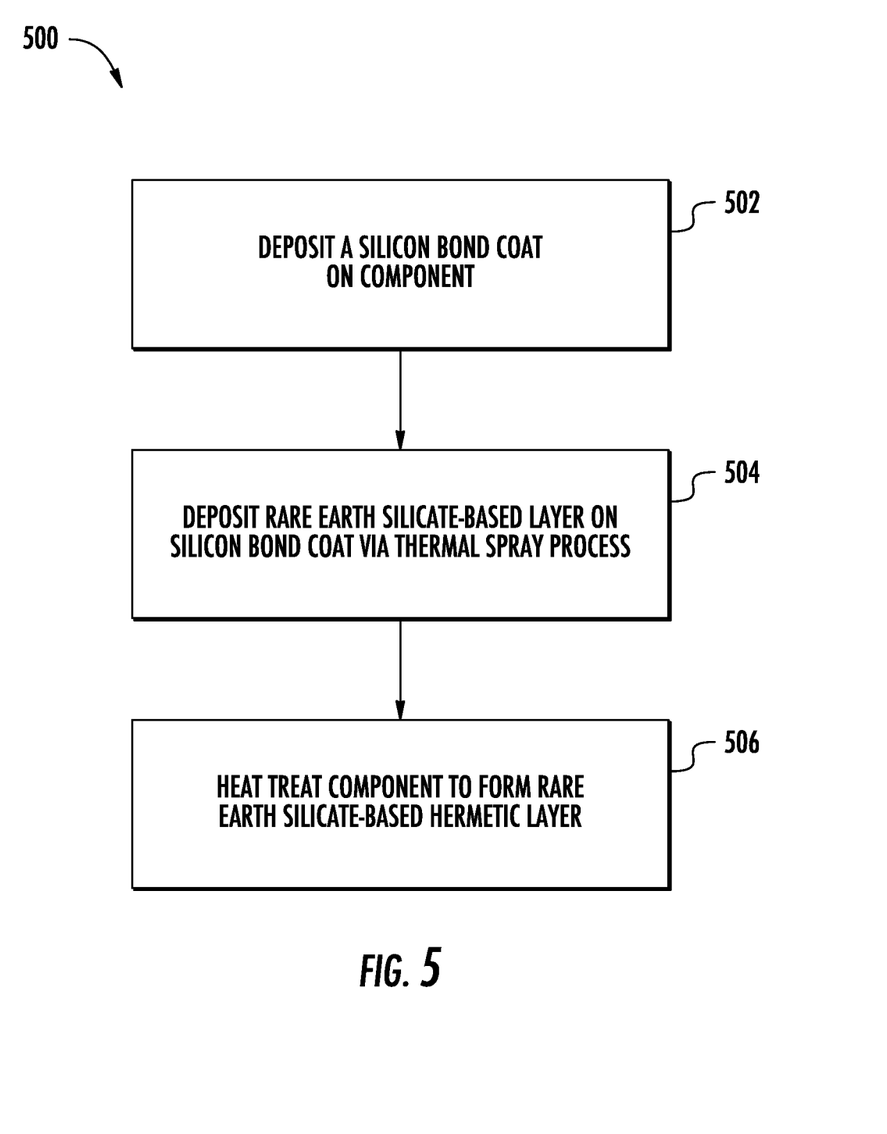
FIG. 5 is a flowchart of a method of coating a component according to example embodiments of the present disclosure.

FIG. 5 illustrates a flowchart for a method (500) of coating a component (e.g., a composite component) with the EBC disclosed herein. At (502), the method includes depositing a bondcoat layer (e.g., a silicon bondcoat layer) on the surface of the component. The component can include a CMC component. The coating may be applied via any known coating technique including, but not limited to brushing, rolling, spraying, and dipping. Spraying techniques include thermal spray processes including plasma spraying and air-plasma spraying. In accordance with aspects of the present disclosure, the bondcoat layer may be applied by thermal spray processes, chemical vapor deposition processes, electron beam physical vapor deposition processes, dipping in molten silicon, sputtering processes, and other conventional application processes known to those skilled in the art.

In certain embodiments, deposition of the silicon bondcoat deposits a layer of silicon metal to the surface of the component. The silicon can be applied directly to a grit blasted surface of the component, for example by thermal spraying on the component when the component is at an elevated temperature. The silicon bondcoat can be applied as a thin layer while completely covering the component to avoid any bare spots. Typically, the bondcoat has a thickness ranging from 50 micrometers to 150 micrometers, such as 70 micrometers to 120 micrometers, such as 100 micrometers.

Optionally, prior to applying the bondcoat layer on the surface of the component, the component can be pretreated mechanically, chemically or both to make the surface more receptive for the EBC. Suitable pretreatment methods include grit blasting, with or without masking of surfaces that are not to be subjected to grit blasting, dry-ice blasting, micromachining, shot peening, laser etching, treatment with chemical etchants such as those containing hydrochloric acid, hydrofluoric acid, nitric acid, ammonium bifluorides and mixtures thereof, treatment with water under pressure (i.e., water jet treatment), with or without loading with abrasive particles, as well as various combinations of these methods.

At (504), the method includes depositing a rare earth silicate-based layer (or layers) on the bondcoat. The rare earth silicate-based layer can be deposited via any spraying process, including thermal spray processes. In certain embodiments, the rare earth silicate-based layer is deposited via plasma spraying, including APS. For example, a feedstock for a thermal spray process (e.g., APS) including rare earth silicate can be prepared. For example, the feedstock can include a rare earth monosilicate(s) and/or a mixture of a rare earth monosilicate material(s) and a rare earth disilicate material(s). In certain embodiments, the feedstock includes any rare earth silicate including a silicate having a rare earth element selected from the group consisting of ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a mixture thereof. In various embodiments, the rare earth silicate is $(Yb_x, Y_{1-x})_2Si_2O_7$ and/or $(Yb_y\text{—}Y_{1-y})_2SiO_5$ where $0 \le x \le 1$ and as described above. In a particular embodiment, the rare earth silicate is $Yb_2Si_2O_7$.

The rare earth silicate-based layer deposited on the bondcoat could be applied using a range of spray parameters known by someone skilled in the art. As an example, the substrate could be pre-heated prior to deposition in a range of 150° F. to 1200° F. The standoff distance could range from 2 inches to 8 inches. The primary gas could be argon, nitrogen, or helium in a range of from 30 standard cubic feet per hour (SCFH) to 200 SCFH. The secondary gas could be helium, hydrogen, argon, or nitrogen in a range from 60 SCFH to 200 SCFH. The carrier gas could be argon or nitrogen in the range of from 10 SCFH to 20 SCFH. The amperage during spray could range from 500 amps to 1000 amps. The powder feedrate could be in the range of 0.25 lb/hr to 8 lb/hr.

At (506) the method includes heat treating the component such that the rare earth silicate-based layer forms a rare earth silicate-based hermetic layer adjacent to the bondcoat layer and at least one rare earth silicate-based non-hermetic layer thereon. For example, the post-spray heat treatment can include ramp heating the component in increments of 0.1° C. to 10° C. per minute to a sintering temperature ranging from 1200° C. and 1400° C. Once the desired temperature is reached, the component can be held at the desired sintering temperature for between 2 hours and 200 hours. After heat treating, the component can be gradually cooled via ramping the temperature back down in increments of 0.1° C. to 50° C. per minute, such as 10° C. per minute until the component reaches room/ambient temperature.

Heat treating the coated component can be completed in-situ or ex-situ. In embodiments, heat treatment of the component facilitates the formation of a rare earth silicate-based hermetic layer adjacent to the bondcoat layer and at least one rare earth silicate-based non-hermetic layer thereon.

Figure 6:
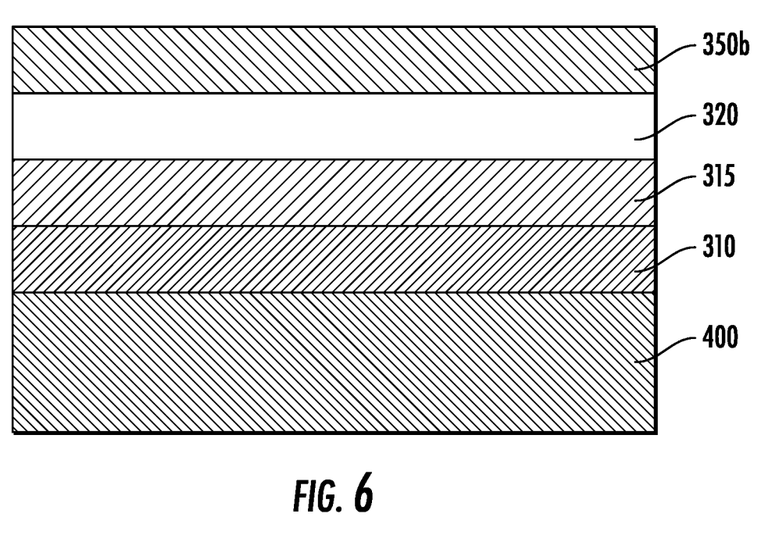
FIG. 6 is a cross-sectional representation of an EBC applied to a component according to another example embodiments of the present disclosure.

In an alternative embodiment, the sintering aid may be included within an intermediate layer positioned between the bond coat and the silicate-based layer, prior to heat treatment. Referring to FIG. 6, for example, an intermediate layer 315 is shown between the bond coat 310 and the silicate-based layer 320 prior to heat treatment. The bond coat 310 may be a silicon-based bond coat, with or without sintering aids present in the bond coat 310. The intermediate layer 315 includes a sintering aid(s) as described above, optionally with a silicon oxide as a co-sintering agent, in an amount sufficient to sinter the overlying, subsequently applied silicate-based layers during heat treatment. In one embodiment, the sintering aids may form essentially the entire intermediate layer 315 in terms of wt. % (e.g., 95 wt. % or greater). Alternatively, the intermediate layer 315 may include amount of 0.001 wt. % to 10 wt. %, such as 0.01 wt. % to 5 wt. % of the sintering aids with a carrier material compatible with the EBC (e.g., silicon, a ceramic, a silicate, or other matrix). The intermediate layer 315 may be formed to a relatively thin thickness so as to either be substantially diffused into adjacent layers or remain at a small thickness in the EBC 300 (e.g., thinner than the thickness of the bond coat 310).

In one embodiment, the intermediate layer 315 may include the material of the bond coat 310 (e.g., silicon) and the sintering aid. Alternatively, the intermediate layer 315 may include the material of the silicate-based layer 320, with the addition of the sintering aid and an optional silicon oxide (as a co-sintering agent). In either embodiment, the sintering aid diffuses into the silicate-based layer 320 to facilitate its densification.

During heat treatment (e.g., the treatment temperature described above), the sintering aid diffuses into the overlying, subsequently applied silicate-based layers to convert rare earth monosilicate to rare earth disilicate to form the EBC as shown above in any of FIGS. 2-4.

Figure 7:
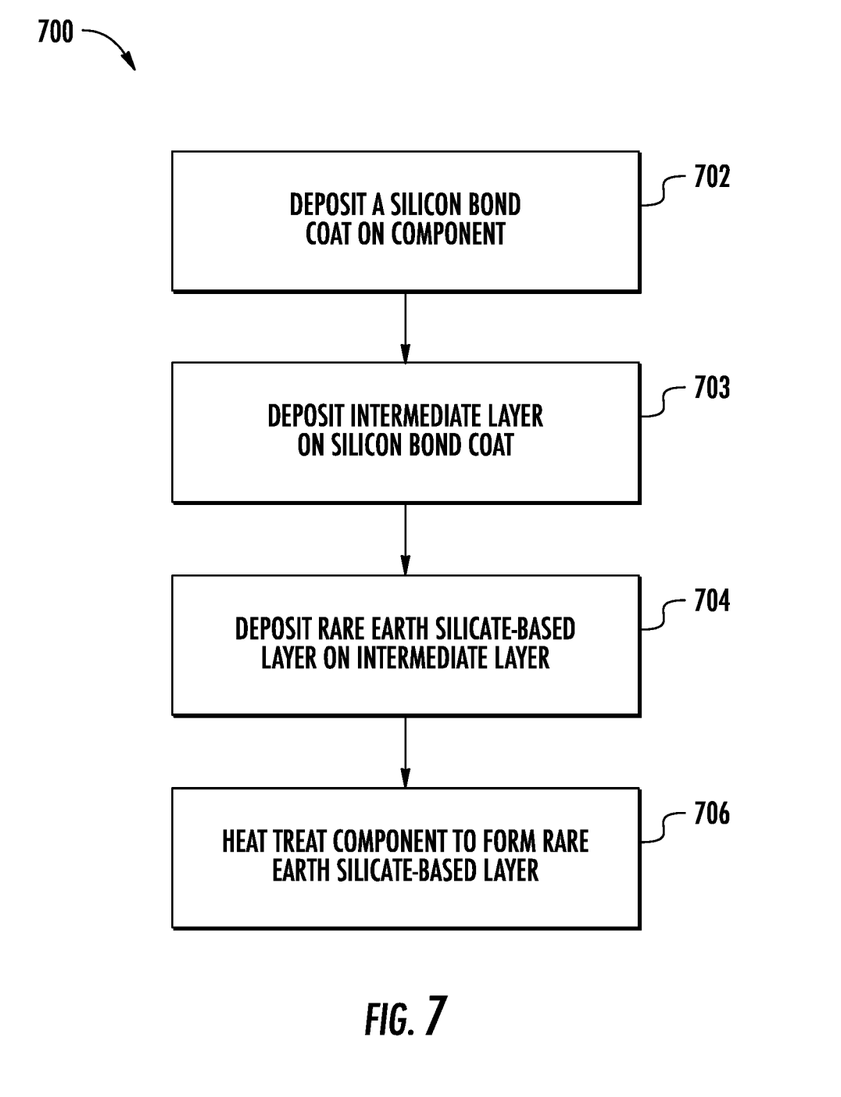
FIG. 7 is a flowchart of a method of coating a component according to another example embodiment of the present disclosure.

FIG. 7 illustrates a flowchart for a method (700) of coating a component (e.g., a composite component) with the EBC disclosed herein. At (702), the method includes depositing a bondcoat layer (e.g., a silicon bondcoat layer) on the surface of the component, such as discussed above with respect to FIG. 5 at (502).

At (703), the method includes forming an intermediate layer on the bond coat, where the intermediate layer includes a sintering aid as discussed above. At (704), the method includes depositing a rare earth silicate-based layer (or layers) on the intermediate layer, such as described above with respect to FIG. 5 at (504). At (706) the method includes heat treating the component such that the rare earth silicate-based layer forms a rare earth silicate-based hermetic layer on the bondcoat layer and at least one rare earth silicate-based non-hermetic layer thereon, such as described above with respect to FIG. 5 at (506). The intermediate layer may, in one embodiment, be consumed via diffusion into the EBC or may be present in a small amount or thickness (e.g., thinner than the bond coat).

Further aspects of the present disclosure are provided by the subject matter of the following clauses:

1. A rare earth silicate-based coating system deposited via a thermal spray process, the coating system comprising: a bondcoat layer comprising silicon; a rare earth silicate-based hermetic layer on the bondcoat layer, the rare earth silicate-based hermetic layer having an elastic modulus ranging from 100 GPa to 180 GPa; and at least one rare earth silicate-based non-hermetic layer on the rare earth silicate-based hermetic layer, the at least one rare earth silicate-based non-hermetic layer having an elastic modulus ranging from 50 GPa to 100 GPa.
2. The environmental barrier coating of any preceding clause, wherein the rare earth silicate-based hermetic layer has a hermetic microstructure having a density of 85% or more of its theoretical density.
3. The environmental barrier coating of any preceding clause, wherein the rare earth silicate-based hermetic layer comprises a hermetic microstructure having a closed porosity, said closed porosity comprising a porosity by volume of less than 15 percent.
4. The environmental barrier coating of any preceding clause, wherein the hermetic microstructure of the rare earth silicate-based hermetic layer is formed by sintering a rare earth silicate in-situ or ex-situ with a sintering aid.
5. The environmental barrier coating of any preceding clause, wherein the rare earth silicate-based hermetic layer comprises a rare earth disilicate.
6. The environmental barrier coating of any preceding clause, wherein the rare earth silicate-based hermetic layer has a thickness of from 6 micrometers to 15 micrometers.
7. The environmental barrier coating of any preceding clause, wherein the at least one rare earth silicate-based non-hermetic layer has a thickness of from 10 micrometers to 1250 micrometers.
8. The environmental barrier coating of any preceding clause, wherein the rare earth silicate-based hermetic layer comprises a rare earth silicate composition that is different from the at least one rare earth silicate-based non-hermetic layer.
9. The environmental barrier coating of any preceding clause, wherein the at least one rare earth silicate-based non-hermetic layer comprises a first rare earth silicate-based non-hermetic layer having a thickness of from 10 micrometers to 200 micrometer and a second rare earth silicate-based non-hermetic layer having a thickness of from 10 micrometers to 1250 micrometers.
10. The environmental barrier coating of any preceding clause, wherein the rare earth silicate-based hermetic layer is substantially free from rare earth monosilicates.
11. The environmental barrier coating of any preceding clause, wherein the at least one rare earth silicate-based non-hermetic layer comprises from 5 volume % to 25 volume % of one or more rare earth monosilicates.
12. The environmental barrier coating of any preceding clause, wherein the rare earth silicate-based hermetic layer and/or the at least one rare earth silicate-based non-hermetic layer comprise a rare earth silicate having a rare earth element selected from ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a combination thereof.
13. A coated component, comprising: a substrate having a surface; and the environmental barrier coating of any preceding clause on the surface of the substrate.
14. A gas turbine engine component, comprising: a turbine engine component having a surface; and the environmental barrier coating of any preceding clause on the surface of the turbine engine component.
15. A method for coating a gas turbine engine component, comprising: forming a silicon bondcoat on the gas turbine engine component, wherein the silicon bondcoat includes a sintering aid; forming a silicate-based layer on the silicon bondcoat with a thermal spray process; and heat treating the gas turbine engine component such that the sintering aid diffuses into the silicate-based layer to form a rare earth silicate-based hermetic portion adjacent to the silicon bondcoat and a rare earth silicate-based non-hermetic portion thereon, wherein the rare earth silicate-based hermetic layer has an elastic modulus of from 100 GPa to 180 GPa, and wherein the at least one rare earth silicate-based non-hermetic layer has an elastic modulus ranging from 50 GPa to 100 GPa.
16. The method of any preceding clause, wherein heat treating is performed at a heat sintering temperature of 1200° C. and 1400° C.
17. A method for coating a gas turbine engine component, comprising: forming a silicon bondcoat on the gas turbine engine component; forming an intermediate layer on the silicon bondcoat, wherein the intermediate layer includes a sintering aid; forming a silicate-based layer on the intermediate layer with a thermal spray process; and heat treating the gas turbine engine component such that the sintering aid diffuses into the silicate-based layer to form a rare earth silicate-based hermetic portion closest to the silicon bondcoat and a rare earth silicate-based non-hermetic portion thereon, wherein the rare earth silicate-based hermetic layer has an elastic modulus of from 100 GPa to 180 GPa, and wherein the at least one rare earth silicate-based non-hermetic layer has an elastic modulus ranging from 50 GPa to 100 GPa.
18. The method of any preceding clause, wherein heat treating is performed at a heat sintering temperature of 1200° C. and 1400° C.
19. The method of any preceding clause, wherein the intermediate layer includes silicon and the sintering aid.
20. The method of any preceding clause, wherein the intermediate layer includes a silicate-based compound, the sintering aid, and a silicon oxide.

This written description uses exemplary embodiments to disclose various examples, including the best mode, and also to enable any person skilled in the art to practice the disclosed embodiments, including making and using any devices or systems and performing any incorporated methods. The patentable scope of the disclosed embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rare earth silicate-based coating system deposited via a thermal spray process, the coating system comprising:
   a bondcoat layer comprising silicon and a sintering aid;
   a rare earth silicate-based hermetic layer on the bondcoat layer, the rare earth silicate-based hermetic layer having an elastic modulus ranging from 100 GPa to 180 GPa; and
   at least one rare earth silicate-based non-hermetic layer on the rare earth silicate-based hermetic layer, the at least one rare earth silicate-based non-hermetic layer having an elastic modulus ranging from 50 GPa to 100 GPa.

2. The environmental barrier coating of claim 1, wherein the rare earth silicate-based hermetic layer has a hermetic microstructure having a density of 85% or more of its theoretical density.

3. The environmental barrier coating of claim 1, wherein the rare earth silicate-based hermetic layer comprises a hermetic microstructure having a closed porosity, said closed porosity comprising a porosity by volume of less than 15 percent.

4. The environmental barrier coating of claim 3, wherein the hermetic microstructure of the rare earth silicate-based hermetic layer is formed by sintering a rare earth silicate in-situ or ex-situ with the sintering aid.

5. The environmental barrier coating of claim 1, wherein the rare earth silicate-based hermetic layer comprises a rare earth disilicate.

6. The environmental barrier coating of claim 1, wherein the rare earth silicate-based hermetic layer has a thickness of from 6 micrometers to 15 micrometers.

7. The environmental barrier coating of claim 1, wherein the at least one rare earth silicate-based non-hermetic layer has a thickness of from 10 micrometers to 1250 micrometers.

8. The environmental barrier coating of claim 1, wherein the rare earth silicate-based hermetic layer comprises a rare earth silicate composition that is different from the at least one rare earth silicate-based non-hermetic layer.

9. The environmental barrier coating of claim 8, wherein the at least one rare earth silicate-based non-hermetic layer comprises a first rare earth silicate-based non-hermetic layer having a thickness of from 10 micrometers to 200 micrometer and a second rare earth silicate-based non-hermetic layer having a thickness of from 10 micrometers to 1250 micrometers.

10. The environmental barrier coating of claim 1, wherein the rare earth silicate-based hermetic layer is substantially free from rare earth monosilicates.

11. The environmental barrier coating of claim 1, wherein the at least one rare earth silicate-based non-hermetic layer comprises from 5 volume % to 25 volume % of one or more rare earth monosilicates.

12. The environmental barrier coating of claim 1, wherein the rare earth silicate-based hermetic layer and/or the at least one rare earth silicate-based non-hermetic layer comprise a rare earth silicate having a rare earth element selected from ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a combination thereof.

13. A coated component, comprising:
   a substrate having a surface; and
   the environmental barrier coating of claim 1 on the surface of the substrate.

14. A gas turbine engine component, comprising:
   a turbine engine component having a surface; and
   the environmental barrier coating of claim 1 on the surface of the turbine engine component.

15. A method for coating a gas turbine engine component, comprising:
   forming a silicon bondcoat on the gas turbine engine component, wherein the silicon bondcoat includes a sintering aid;
   forming a silicate-based layer on the silicon bondcoat with a thermal spray process; and
   heat treating the gas turbine engine component such that the sintering aid diffuses into the silicate-based layer to form a rare earth silicate-based hermetic portion adjacent to the silicon bondcoat and a rare earth silicate-based non-hermetic portion thereon, wherein the rare earth silicate-based hermetic layer has an elastic modulus of from 100 GPa to 180 GPa, and wherein the at least one rare earth silicate-based non-hermetic layer has an elastic modulus ranging from 50 GPa to 100 GPa.

16. The method of claim 15, wherein heat treating is performed at a heat sintering temperature of 1200° C. and 1400° C.

17. A method for coating a gas turbine engine component, comprising:
   forming a silicon bondcoat on the gas turbine engine component;
   forming an intermediate layer on the silicon bondcoat, wherein the intermediate layer includes a sintering aid;
   forming a silicate-based layer on the intermediate layer with a thermal spray process; and
   heat treating the gas turbine engine component such that the sintering aid diffuses into the silicate-based layer to form a rare earth silicate-based hermetic portion closest to the silicon bondcoat and a rare earth silicate-based non-hermetic portion thereon, wherein the rare earth silicate-based hermetic layer has an elastic modulus of from 100 GPa to 180 GPa, and wherein the at least one rare earth silicate-based non-hermetic layer has an elastic modulus ranging from 50 GPa to 100 GPa.

18. The method of claim 17, wherein heat treating is performed at a heat sintering temperature of 1200° C. and 1400° C.

19. The method of claim 17, wherein the intermediate layer includes silicon and the sintering aid.

20. The method of claim 17, wherein the intermediate layer includes a silicate-based compound, the sintering aid, and a silicon oxide.

* * * * *